United States Patent
Chao

(10) Patent No.: US 9,398,278 B2
(45) Date of Patent: Jul. 19, 2016

(54) GRAPHICAL DISPLAY SYSTEM WITH ADAPTIVE KEYSTONE MECHANISM AND METHOD OF OPERATION THEREOF

(75) Inventor: Yi-Chung Chao, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 760 days.

(21) Appl. No.: 12/986,168

(22) Filed: Jan. 6, 2011

(65) Prior Publication Data

US 2012/0176415 A1 Jul. 12, 2012

(51) Int. Cl.
*G03B 21/14* (2006.01)
*H04N 9/31* (2006.01)

(52) U.S. Cl.
CPC .................................. *H04N 9/3185* (2013.01)

(58) Field of Classification Search
CPC .............................. H04N 9/3185; G09G 5/00
USPC ....................................................... 353/69, 70
See application file for complete search history.

(56) References Cited

U.S. PATENT DOCUMENTS

| | | | |
|---|---|---|---|
| 5,508,593 A | 4/1996 | George | |
| 6,191,827 B1 | 2/2001 | Segman et al. | |
| 6,208,318 B1 | 3/2001 | Anderson et al. | |
| 6,310,662 B1 * | 10/2001 | Sunakawa et al. | 348/747 |
| 6,481,855 B2 | 11/2002 | Oehler | |
| 6,520,647 B2 | 2/2003 | Raskar | |
| 6,753,907 B1 | 6/2004 | Sukthankar et al. | |
| 6,765,544 B1 | 7/2004 | Wynne Willson | |
| 6,974,217 B2 | 12/2005 | Kimura et al. | |
| 7,125,122 B2 | 10/2006 | Li et al. | |
| 7,144,115 B2 | 12/2006 | Li | |
| 7,537,351 B2 | 5/2009 | Saito | |
| 2004/0201594 A1 | 10/2004 | Nashida et al. | |
| 2006/0204125 A1 | 9/2006 | Kempf et al. | |
| 2007/0201006 A1 * | 8/2007 | Amano et al. | 353/31 |
| 2007/0291233 A1 * | 12/2007 | Culbertson et al. | 353/34 |
| 2008/0062164 A1 | 3/2008 | Bassi et al. | |
| 2009/0310088 A1 * | 12/2009 | Jung et al. | 353/69 |

OTHER PUBLICATIONS

Jules Bloomenthal and Jon Rokne, "Homogeneous Coordinates", The Visual Computer, 1994, pp. 15-26, vol. 11.
Ingrid Carlbom and Joseph Paciorek, "Planar Geometric Projections and Viewing Transformations", Computing Surveys, Dec. 1978, vol. 10, No. 4.

(Continued)

*Primary Examiner* — Sultan Chowdhury
*Assistant Examiner* — Danell L Owens
(74) *Attorney, Agent, or Firm* — IP Investment Law Group

(57) ABSTRACT

A method of operation of a graphical display system includes: generating a first registration point of an adaptive alignment image; calculating the adaptive alignment image having a first alignment point with a known location relative to the first registration point; projecting a projected image, having a first projected registration point, with the adaptive alignment image for displaying on a display surface with the first alignment point is a first projected alignment point on the display surface; calculating an adjustment for the adaptive alignment image using a relative location between the first alignment point and the first registration point, and the first projected alignment point and the first projected registration point, respectively; and creating an apparent image as an adaptive keystone corrected perception of the projected image by modifying the display image with the adjustment for displaying from a projector device.

38 Claims, 8 Drawing Sheets

(56) References Cited

OTHER PUBLICATIONS

Pei Chen and David Suter, "Simultaneously Estimating the Fundamental Matrix and Homographies", IEEE Transactions on Robotics, Dec. 2009, pp. 1425-1431, vol. 25, No. 6.

Andrew Harvey, "(x,y,z,w) in OpenGL/Direct3D (Homogeneous Coordinates)", Sep. 29, 2008, http://andrewharvey4.wordpress.com/2008/09/29/xyzw-in-opengldirect3d-homogeneous-coordinates.

Paul Heckbert, "Projective Mappings for Image Warping", Rendering, Sep. 26, 1995, (excerpted from pp. 17-21 of "Fundamentals of Texture Mapping and Image Warping", Master's thesis, Jun. 1989, UCB/CSD 89/516, CS Division, U.C. Berkeley).

Branislav Micusik and Jana Kosecka, "Piecewise Planar City 3D Modeling from Street View Panoramic Sequences", IEEE Computer Society Conference on Computer Vision and Pattern Recognition (CVPR), FL, 2009.

Ramesh Raskar and Paul Beardsley, "A Self Correcting Projector", Mitsubishi Electric Research Laboratories, Dec. 2001, Publisher: IEEE Computer Vision and Pattern Recognition (CVPR), Hawaii.

\* cited by examiner

GRAPHICAL DISPLAY SYSTEM WITH ADAPTIVE KEYSTONE MECHANISM AND METHOD OF OPERATION THEREOF

TECHNICAL FIELD

The present invention relates generally to a graphical display system and more particularly to a graphical display system with adaptive keystone mechanism.

BACKGROUND ART

Modern portable consumer and industrial electronics, especially client devices such as smart phones, portable digital assistants, navigation systems, portable entertainment units, and combination devices, are providing increasing levels of functionality to support modern life, including graphical display systems. Numerous technologies have been developed to utilize this new functionality including advanced display systems. Some of the research and development strategies focus on new technologies while others focus on improving the existing and mature technologies. Research and development in the existing technologies can take a myriad of different directions.

As users become more empowered with the growth of mobile devices, new and old paradigms begin to take advantage of this new device space. There are many technological solutions to take advantage of this new device location opportunity. One existing approach is to use projection-based display systems to present graphical information, such as images, video, or text, using a mobile device such as a cellphone, PDA (Portable Digital Assistant) or portable computer. However, the ability for users to project the graphical images on a variety of surfaces with different textures, incident angles, and orientations does not automatically translate to providing a safe, quick, and effective method of display for each individual.

Thus, a need still remains for a graphical display system with adaptive keystone mechanism for increasing image quality, improving readability, and increasing display performance. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a graphical display system including: generating a first registration point of an adaptive alignment image; calculating the adaptive alignment image having a first alignment point with a known location relative to the first registration point; projecting a projected image, having a first projected registration point, with the adaptive alignment image for displaying on a display surface with the first alignment point is a first projected alignment point on the display surface; calculating an adjustment for the adaptive alignment image using a relative location between the first alignment point and the first registration point, and the first projected alignment point and the first projected registration point, respectively; and creating an apparent image as an adaptive keystone corrected perception of the projected image by modifying the display image with the adjustment for displaying from a projector device.

The present invention provides a graphical display system including: a storage unit for generating a first registration point of an adaptive alignment image; a control unit, coupled to the storage unit, for calculating the adaptive alignment image having a first alignment point with a known location relative to the first registration point; a projector unit, coupled to the control unit, for projecting a projected image, having a first projected registration point, with the adaptive alignment image for displaying on a display surface with the first alignment point is a first projected alignment point on the display surface; a calculate adjustment module, coupled to the control unit, for calculating an adjustment for the adaptive alignment image using a relative location between the first alignment point and the first registration point, and the first projected alignment point and the first projected registration point, respectively; and a controller interface, coupled to the projector unit, for creating an apparent image as an adaptive keystone corrected perception of the projected image by modifying the display image with the adjustment for displaying from a projector device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
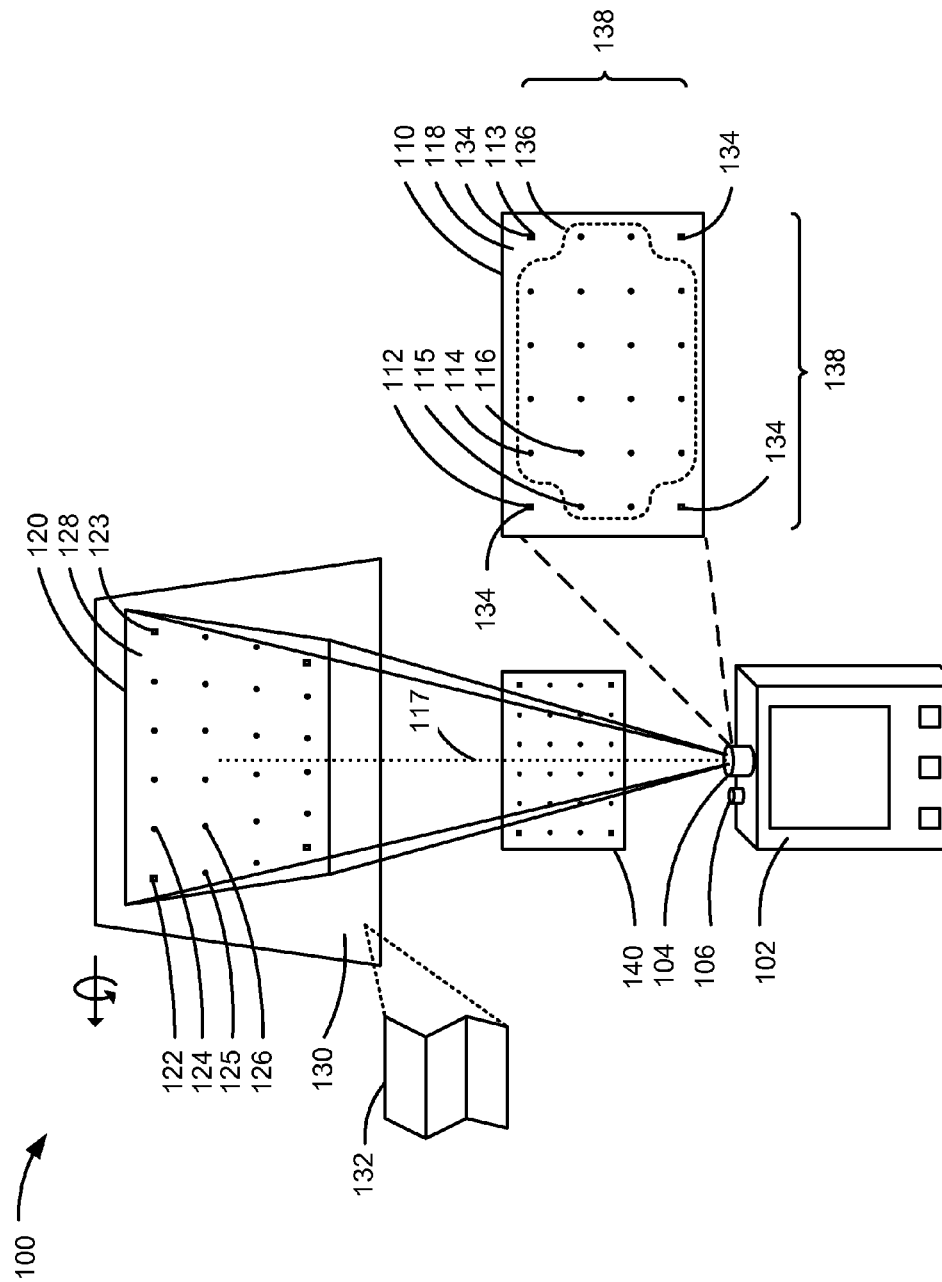
FIG. 1 is an example of a graphical display system with adaptive keystone mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another, will ordinarily be described with similar reference numerals. The embodiments have been numbered first embodiment, second embodiment, etc., as a matter of descriptive convenience and are not intended to have any other significance or provide limitations for the present invention.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), optical components, passive devices, or a combination thereof.

Referring now to FIG. 1, therein is shown an example of a graphical display system 100 with adaptive keystone mechanism in an embodiment of the present invention. The graphical display system 100 is defined as a system for projecting a display image 110 onto a display surface 130 and adaptively adjusting the display image 110 to the display surface 130 for providing an apparent image 140 as readable to a user of the graphical display system 100. The graphical display system 100 can include a projector device 102 that can create, receive, and display graphical and text information. The projector device 102 is for projecting the display image 110 onto the display surface 130, such as a wall or screen, and adjusting the display image 110 to compensate for the keystone effect and other distortions caused by projecting the display image 110 on the display surface 130. The projector device 102 can include a projector unit 104 and an imaging unit 106.

The projector device 102 can create the display image 110 and project the display image 110 on the display surface 130 resulting in a projected image 120. Projecting the projected image 120 can create the apparent image 140. The apparent image 140 is the perceived image of the projected image 120 from the perspective of a user of the projector device 102. The apparent image 140 is the keystone corrected image of the display image 110.

The display image 110 is the image to be projected by the projector device 102. The display image 110 can include text, video, graphical information, or any combination thereof.

For example, the projector device 102 can be a mobile device capable of generating graphical content that can be viewed by projecting the display image 110 onto the display surface 130. The projector device 102 can provide functionalities including generating graphical imagery including text, video, graphics, or any combination thereof.

In another example, the projector device 102 can include a handheld entertainment device, a gaming device, an augmented reality visualization system, a portable presentation system, or any combination thereof. The projector device 102 can include components such as hardware, software, memory, dedicated computational units, optical components, illumination units, digital cameras, memory storage units, or any combination thereof.

The imaging unit 106 is for capturing a representation of the projected image 120. The imaging unit 106 can include a digital camera, charged coupled device (CCD), infrared sensor, ultraviolet sensor, pinhole camera sensor, or any combination thereof.

The projector device 102 can include the projector unit 104. The projector unit 104 is an optical device capable of projecting the display image 110 onto the display surface 130 to create the projected image 120. The projector device 102 can include a micro projector, a micro-electromechanical system (MEMS), digital micro-mirror device (DMD), an illumination source, an imager chip, a digital light processor, laser video display system, color sequential light emitting diode system, laser scanning projector, liquid crystal on silicon (LCOS) micro-projector, retinal scan display, or any combination thereof.

The display surface 130 is a surface for receiving the projection of the display image 110 and for viewing the projected image 120. The display surface 130 can be a variety of surface types. For example, the display surface 130 can include a projector screen, a wall, a smooth surface, an irregular surface, an inclined surface, a multi-segmented surface, a reflective surface, a matte surface, or any combination thereof.

The display surface 130 can include a surface variation 132. The surface variation 132 is any variation from a smooth surface that is perpendicular to a projection axis 117 of the projector unit 104. The projection axis 117 is defined by a line from the center of the lens of the projector unit 104 to the center of the projected image 120. The surface variation 132 can include the angle of the display surface 130 to the projection axis 117, an irregular surface, a surface with protrusions, a segmented surface, a compound surface, or any combination thereof.

For example, the surface variation 132 can represent the situation where the display surface 130 is rotated 45 degrees from the plane normal to the surface of the Earth and perpendicular to the projection axis 117. This can include the situation where the projector device 102 is positioned below the physical location of the display surface such that the projector device 102 is pointed upward at a 45 degree angle when projecting on the display surface 130.

The display image 110 is the original content in the original aspect ratio to be displayed from the projector device 102 or more specifically from the projector unit 104. For example, the display image 110 can be a television program presented in a 4:3 aspect ratio, where the ratio of the horizontal and vertical size of the display image 110 is 4:3. In another example, the display image 110 can be a square screen of text with an aspect ratio of 1:1. It is understood that the display image 110 can be adjusted to have a different appearance than the original content.

The display image 110 can include an adaptive alignment image 118. The adaptive alignment image 118 is an image that presents a fiduciary mark set 138 that can be used to detect a distortion in the projected image 120 on the display surface 130.

One element of the fiduciary mark set 138 is an object in a field of view that is used as a point of reference, often as a point of reference between multiple images of the same scene. The adaptive alignment image 118 is displayed for an interval of time equal to or less than the amount of time a single frame is displayed in a video stream.

The adaptive alignment image 118 can include a registration point set 134 that can indicate the location of known landmarks in an image. The first registration point 112 can be generated by identifying the coordinates of a known location in the adaptive alignment image 118. The registration point set 134 can include a first registration point 112 and a second registration point 113. For example, the registration point set 134 can represent the four corners of a rectangular image, the center of an image, the upper edge, the right side, the left side, the lower edge, or any combination thereof.

The adaptive alignment image 118 can include an alignment point set 136 that are points between the registration point set 134. The alignment point set 136 can include a first alignment point 114, a second alignment point 115, and a third alignment point 116. The alignment point set 136 can provide a finer degree of granularity that the registration point set 134 for detecting distortions cause by the display surface 130.

The fiduciary mark set 138 can include the registration point set 134 and the alignment point set 136. Although the registration point set 134 and the alignment point set 136 are described separately in this example, The first registration point 112 is a fiduciary mark at a known location on the adaptive alignment image 118 and is used to register and detect the relative distance to and location of the second registration point 113. The first registration point 112 and the second registration point 113 is used to register and detect the relative locations of the first alignment point 114 and the second alignment point 115 on the adaptive alignment image 118.

The first alignment point 114 is a point at a known location on the adaptive alignment image 118 and is used to measure a relative displacement from the first registration point 112 and the second registration point 113. The second alignment point 115 is a point at a known location on the adaptive alignment image 118 and is used to measure a relative displacement from the first registration point 112 and the second registration point 113.

The projected image 120 is the visual result of projecting the display image 110 onto the display surface 130. When projected on the display surface 130, the display image 110 can be visually distorted based on the properties of the display surface 130. For example, if the display surface 130 is at an angle to the plane that is perpendicular to the projection axis 117 of the projector unit 104, then the projected image 120 of the display image 110 would be skewed and appear trapezoidal.

The projected image 120 can include a projected alignment image 128 with a first projected registration point 122, a second projected registration point 123, a first projected alignment point 124, a second projected alignment point 125, and a third projected alignment point 126. The first projected registration point 122 is the location of the first registration point 112 on the projected image 120. The second projected registration point 123 is the location of the second registration point 113 on the projected image 120. The first projected alignment point 124 is the location of the first alignment point 114 on the projected image 120. The second projected alignment point 125 is the location of the second alignment point 115 on the projected image 120.

The relative location of the first projected alignment point 124 from the first projected registration point 122, when compared with the relative location of the first alignment point 114 and the first registration point 112 in the adaptive alignment image 118, can indicate the amount of distortion in the projected image 120 caused by the display surface 130 in the region between the first projected registration point 122 and the first projected alignment point 124. The distance between the first registration point 112 and the first projected alignment point 124 can be calculated to determine the relative scaling factor between the display image 110 and the projected image 120.

For illustrative purposes, the graphical display system 100 is described with the projector device 102 as a single device, although it is understood that the projector device 102 can have different configurations including as a single device or multiple devices with a partitioning of functionality between the multiple devices. For example, the projector device 102 can include a configuration where a mobile computing device is attached to a belt and a separate unit includes the projector unit 104 and the imaging unit 106.

Figure 2:
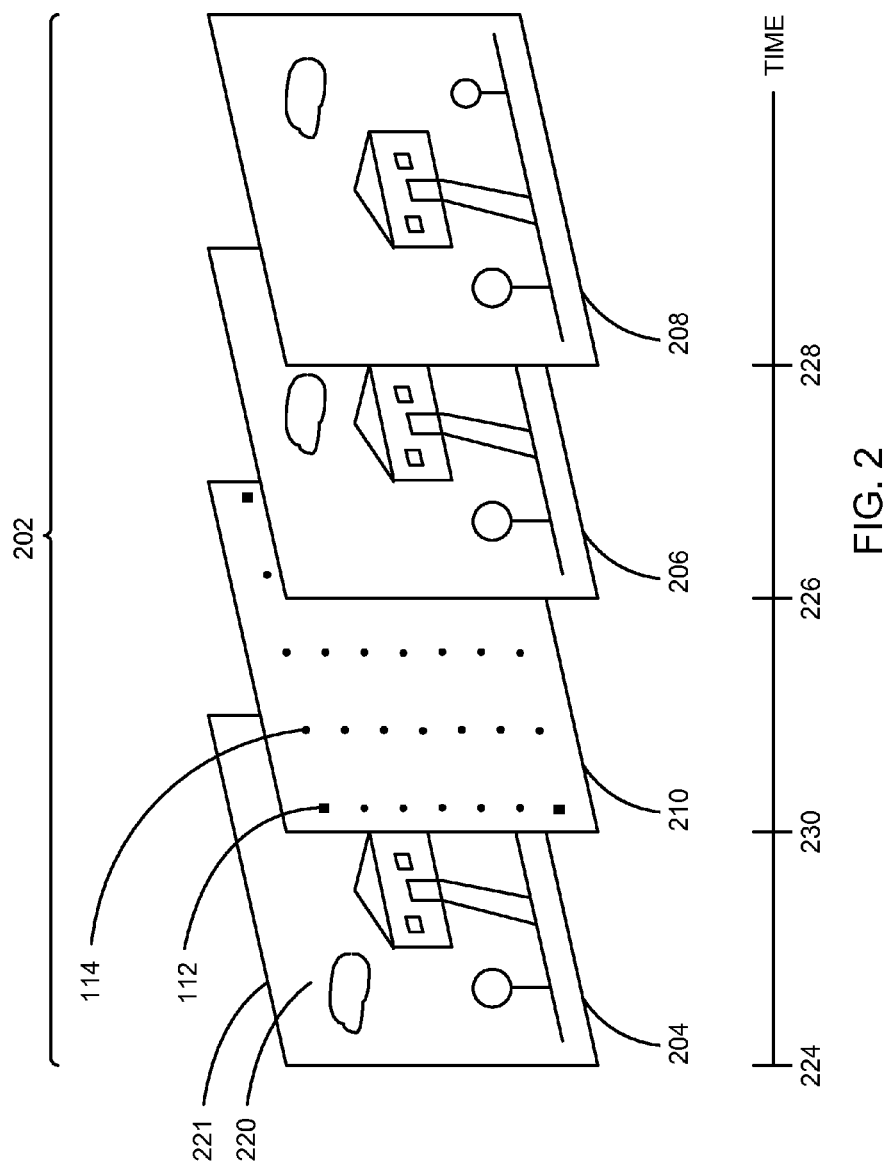
FIG. 2 is an example of the adaptive alignment image inserted into a video stream.

Referring now to FIG. 2, therein is shown an example of the adaptive alignment image 118 inserted into a video stream 202. The graphical display system 100 of FIG. 1 can display the adaptive alignment image 118 of FIG. 1 in the video stream 202 in one frame between other successive frames. The adaptive alignment image 118 can be used to detect a distortion between the display image 110 of FIG. 1 and the projected image 120 of FIG. 1 and then calculate an adjustment to correct for any distortion.

The video stream 202 is a series of individual frames that are displayed sequentially. For example, the video stream can be a 24 frame per second television display. In another example, the video stream can be a graphical output from the display unit of a mobile computing device that is refreshed at 30 frames per second. The graphical output can include a static image, computer presentation slide image, a graphical image, a textual image, vector graphic image, or any combination thereof.

An alignment frame 210 with the adaptive alignment image 118 can be displayed between sequential video frames. For example, the first frame 204 at a first frame time 224 is followed by the alignment frame 210 at an alignment frame time 230, followed by a third frame 206 at a third frame time 226, and a fourth frame 208 at a fourth frame time 228.

The alignment frame 210 includes the adaptive alignment image 118. The adaptive alignment image 118 includes the fiduciary mark set 138 of FIG. 1 including first alignment point 114 and the first registration point 112.

The graphical display system 100 can display the first frame 204, calculate the adaptive alignment image 118 based on the first frame 204, display the adaptive alignment image 118, detect the distortion in the projected image 120, calculate the adjustment to compensate for the distortion, adjust the display image 110 for the third frame 206, and project the display image 110 on the display surface 130 of FIG. 1.

The adaptive alignment image 118 is adaptive because the adaptive alignment image 118 is modified based on an adjacent display image 220. The adjacent display image 220 can include the display image 110 of an adjacent frame 221. For example, for the alignment frame 210, the adjacent frame 221 can be the first frame 204 or the third frame 206. The modifications of the adaptive alignment image 118 are described in a later section.

The adaptive alignment image 118 of the alignment frame 210 can be inserted into the video stream 202 multiple times on a regular basis. Each time the alignment frame 210 is inserted, the graphical display system 100 can detect the current distortion and adjust the display image 110 for the display surface 130. By adaptively and repeatedly adjusting for the distortion, the graphical display system 100 can compensation for the motion of the projector device 102 of FIG. 1 and for changes in the display surface 130.

Although the video stream 202 illustrates a single instance of the alignment frame 210 inserted into the video stream 202, it is understood that different configurations are possible. The video stream 202 can include one or more instances of the alignment frame 210 inserted at different points in time. For example, the adaptive alignment image 118 can be inserted in the alignment frame 210 replacing an existing frame in the video stream 202. In another example, the adaptive alignment image 118 can be inserted in the alignment frame 210 between two successive frames in the video stream 202.

The alignment frame 210 can be inserted into the video stream 202 in response to events that occur during the regular operation of the graphical display system 100. For example, the alignment frame 210 can be inserted into the video stream 202 in response to events such as a change in position, a change in orientation, a timer event, or any combination thereof.

Figure 3:
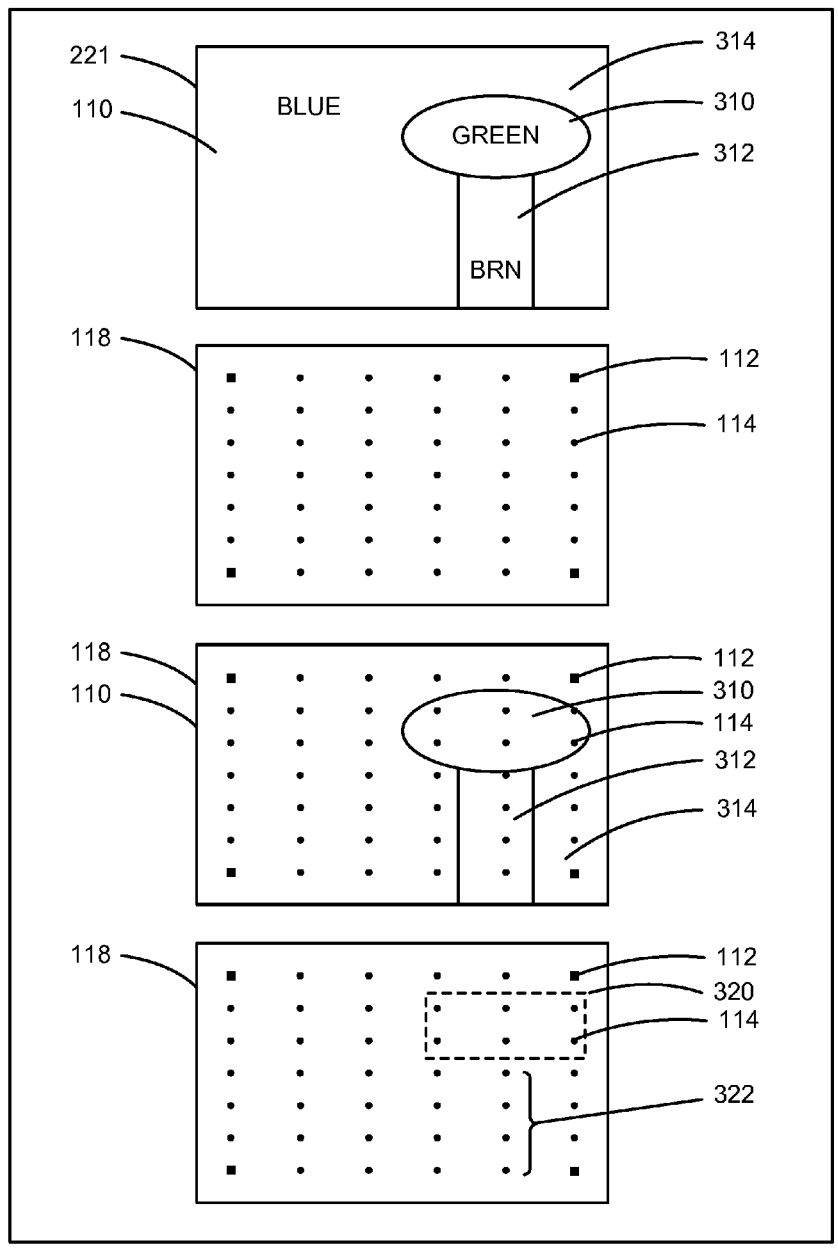
FIG. 3 is an example of the calculation of the adaptive alignment image.

Referring now to FIG. 3, therein is shown an example of the calculation of the adaptive alignment image 118. The adaptive alignment image 118 can be modified based on the adjacent display image 220 of FIG. 2 of the adjacent frame 221. The modification can include variations in the color, brightness, shape, and region of the adaptive alignment image 118. The graphical display system 100 of FIG. 1 can calculate the adaptive alignment image 118 based on the display image 110 of the adjacent display image 220 of the adjacent frame 221.

For example, the adjacent frame 221 can include the display image 110. The display image 110 can include a picture of a tree including a green area 310 representing leaves, a brown area 312 representing the trunk, and a blue area 314 representing the sky.

The adaptive alignment image 118 be modified based on the display image 110 by altering the color of the first registration point 112 and the first alignment point 114 to be the color of the corresponding location on the display image 110. For example, the alignment points that correspond to area under the green area 310 can be designated a green set 320 and assigned the color green. In another example, the alignment points that correspond to the area under the brown area 312 can be designated a brown set 322 and assigned the color brown. The remainder of the alignment point set 136 of FIG. 1 can be assigned the color blue. The remainder of the registration point set 134 of FIG. 1 can be assigned the color blue.

In another example, the first registration point 112 and the first alignment point 114 can be modified based on the brightness of the display image 110 at the same locations. If the first alignment point 114 corresponds to a bright area in the display image 110, then the first alignment point 114 can be modified to have the same brightness as the corresponding location in the display image 110.

The modified version of the adaptive alignment image 118 can include the registration point set 134 and the alignment point set 136 with the same color and the same brightness as the same locations in the display image 110. When the adaptive alignment image 118 is displayed in the video stream 202 of FIG. 2, the adaptive alignment image 118 is less detectable because the color and brightness of the points are similar to the same location in the adjacent frame 221.

Figure 4:
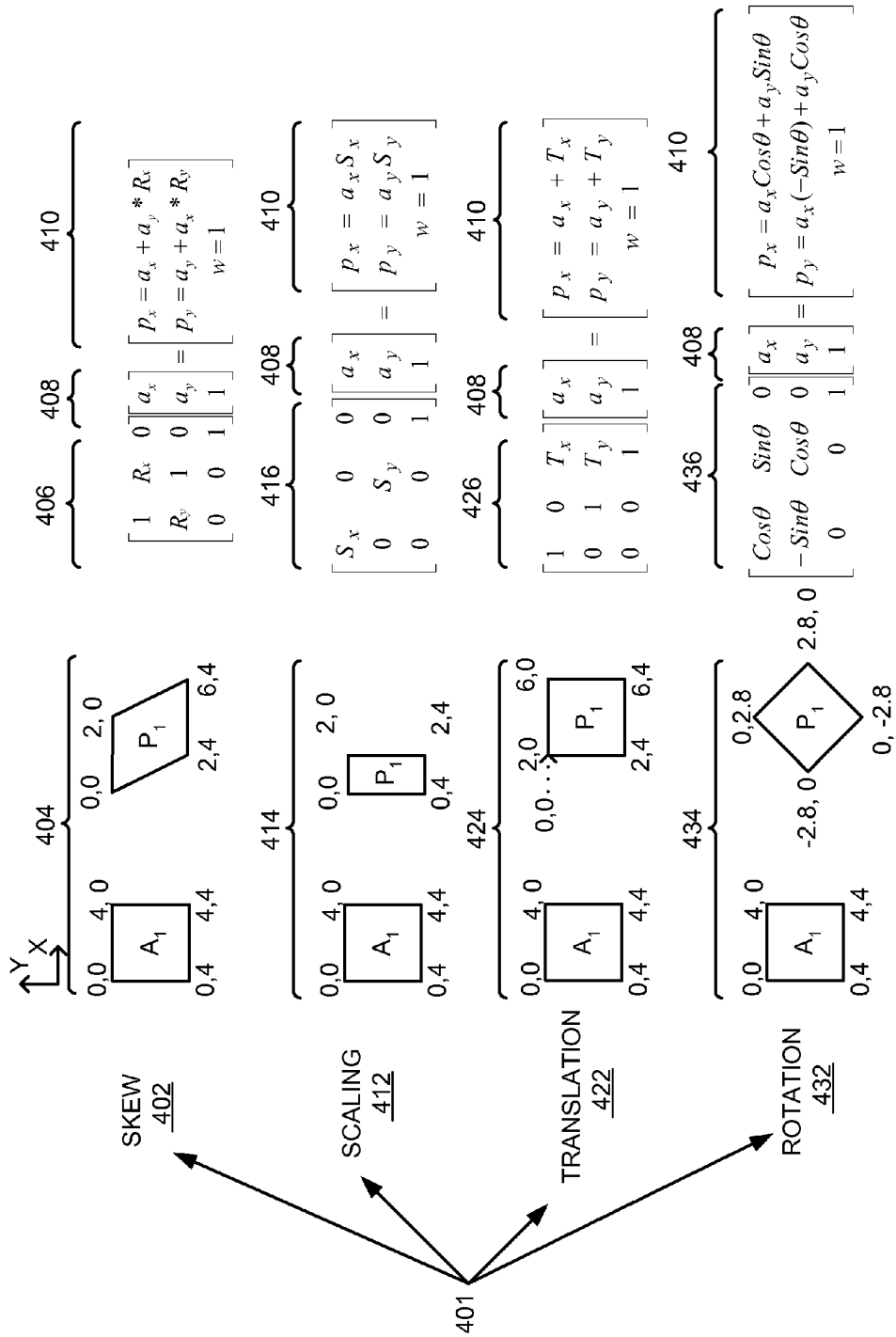
FIG. 4 is an example of an adjustment transform.

Referring now to FIG. 4, therein is shown an example of an adjustment transform 401. The adjustment transform 401 is for describing the relationship between the adaptive alignment image 118 of FIG. 1 and the projected alignment image 128 of FIG. 1. The adjustment transform 401 calculates the adjustment to convert the projected alignment image 128 to be similar to the adaptive alignment image 118. Illustrated are a skew transform 402, a scaling transform 412, a translation transform 422, and a rotation transform 432.

The skew transform 402 diagrams a skew operation 404 converting a square into a skewed quadrilateral. The skew transform 402 includes a skew transform matrix 406 that can be applied to adjust the adaptive alignment image 118 to the projected alignment image 128. The skew transform matrix 406 can include an x-component skew factor $R_x$ and a y-component skew factor $R_y$ that can indicate the skew factor for each component.

Each element in the adaptive alignment image 118 is represented by an alignment element vector 408 that includes an x coordinate, a y coordinate, and a w coordinate that is set to 1. The w coordinate is an additional static coordinate added to the x- and y-coordinates to express the 2-dimensional coordinate of the element in a 3×3 matrix. Each element in the projected alignment image 128 is represented by a projected alignment vector 410 that is the result of the matrix multiplication of the skew transform matrix 406 and the alignment element vector 408.

The scaling transform 412 diagrams a scaling operation 414 converting a square into a scaled quadrilateral that is half the width in the x-direction. The scaling transform 412 includes a scaling transform matrix 416 that can be applied to adjust the adaptive alignment image 118 to the projected alignment image 128. The scaling transform matrix 416 can include an x-component scaling factor $S_x$ and a y-component scaling factor $S_y$ that can indicate the scaling factor for each component.

Each element in the adaptive alignment image 118 is represented by the alignment element vector 408 that includes an x coordinate, a y coordinate, and a w coordinate that is set to 1. The w coordinate is an additional static coordinate added to the x- and y-coordinates to express the 2-dimensional coordinate of the element in a 3×3 matrix. Each element in the projected alignment image 128 is represented by the projected alignment vector 410 that is the result of the matrix multiplication of the scaling transform matrix 416 and the alignment element vector 408.

The translation transform 422 diagrams a translation operation 424 converting a square into a quadrilateral that has been translated a distance of 2 units in the x-direction. The translation transform 422 includes a translation transform matrix 426 that can be applied to adjust the adaptive alignment image 118 to the projected alignment image 128. The translation transform matrix 426 can include an x-component scaling factor $T_x$ and a y-component translation factor $T_y$ that can indicate the translation factor for each component.

Each element in the adaptive alignment image 118 is represented by the alignment element vector 408 that includes an x coordinate, a y coordinate, and a w coordinate that is set to 1. The w coordinate is an additional static coordinate added to the x- and y-coordinates to express the 2-dimensional coordinate of the element in a 3×3 matrix. Each element in the projected alignment image 128 is represented by the projected alignment vector 410 that is the result of the matrix multiplication of the translation transform matrix 426 and the alignment element vector 408.

The rotation transform 432 diagrams a rotation operation 434 converting a square into a quadrilateral that has been rotated 45 degrees. The rotation transform 432 includes a rotation transform matrix 436 that can be applied to adjust the adaptive alignment image 118 to the projected alignment image 128. The rotation transform matrix 436 can include a rotation component scaling factor $\theta$ (theta).

Each element in the adaptive alignment image 118 is represented by the alignment element vector 408 that includes an x coordinate, a y coordinate, and a w coordinate that is set to 1. The w coordinate is an additional static coordinate added to the x- and y-coordinates to express the 2-dimensional coordinate of the element in a 3×3 matrix. Each element in the projected alignment image 128 is represented by the projected alignment vector 410 that is the result of the matrix multiplication of the translation transform matrix 426 and the alignment element vector 408.

Figure 5:
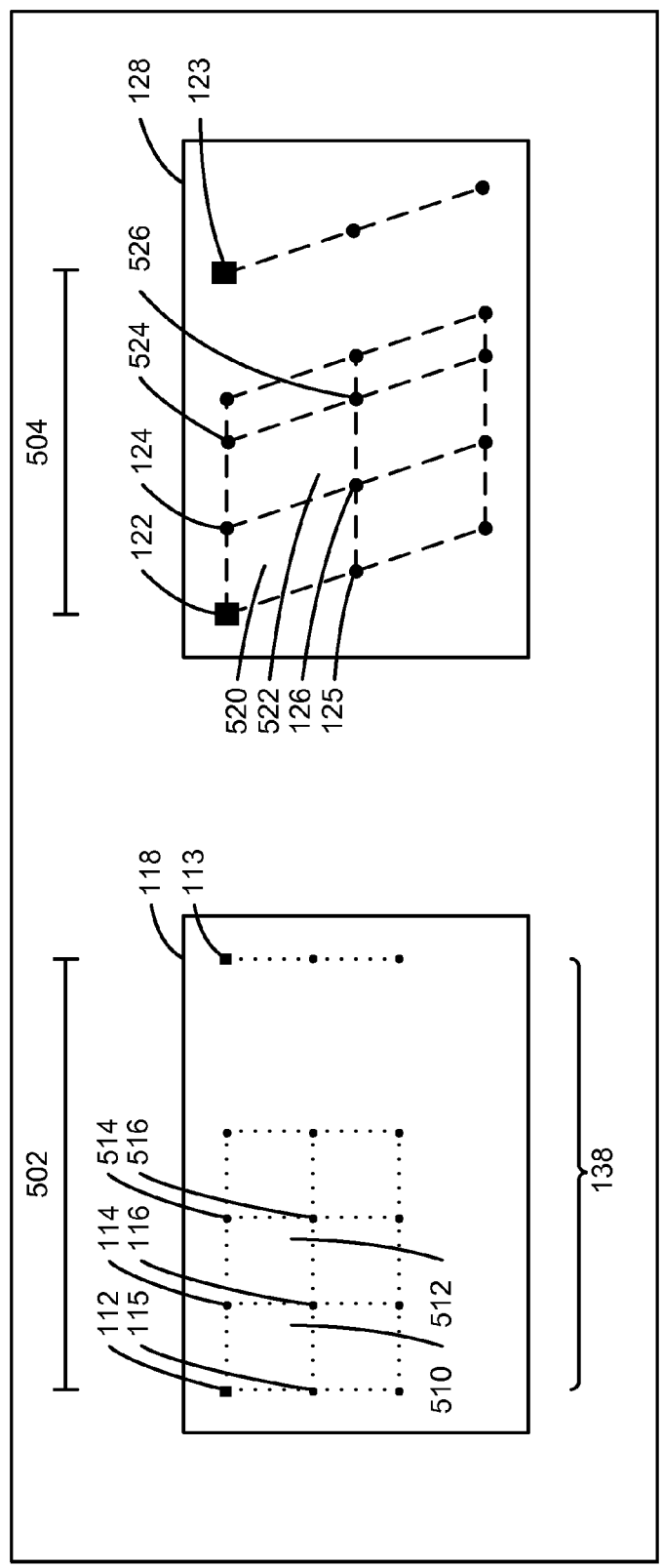
FIG. 5 is a diagram of the mapping between the adaptive alignment image and the projected alignment image.

Referring now to FIG. 5, therein is shown a diagram of the mapping between the adaptive alignment image 118 and the projected alignment image 128. The diagram can show the mapping of the fiduciary mark set 138 of FIG. 1 of the adaptive alignment image 118 to the projected alignment image 128.

The adaptive alignment image 118 can include the first registration point 112 and the second registration point 113. The adaptive alignment image 118 can include the first alignment point 114, the second alignment point 115, the third alignment point 116, a fourth alignment point 514, and a fifth alignment point 516. A registration distance 502 is the distance between the first registration point 112 and the second registration point 113.

The adaptive alignment image 118 can include a first quadrilateral 510 that has corners at the first registration point 112, the first alignment point 114, the second alignment point 115, and the third alignment point 116. The adaptive alignment image 118 can include a second quadrilateral 512 that has corners at the first alignment point 114, the third alignment point 116, the fourth alignment point 514, and the fifth alignment point 516.

The first quadrilateral 510 is a polygon with four sides and four corners. The first quadrilateral 510 can include a square, rectangle, trapezoid, diamond, rhombus, or other four sided shapes. Each quadrilateral is defined by a group of four adjacent fiduciary marks, a combination of alignment points and registration points in the adaptive alignment image 118. Each quadrilateral in the adaptive alignment image 118 maps to the corresponding quadrilateral in the projected alignment image 128.

The projected alignment image 128 can include the first projected registration point 122 of FIG. 1 and the second projected registration point 123. The projected alignment image 128 can include the first projected alignment point 124, the second projected alignment point 125, the third projected alignment point 126, a fourth projected alignment point 524, and a fifth projected alignment point 526.

The projected alignment image 128 can include a first projected quadrilateral 520 that has corners at the first projected registration point 122, the first projected alignment point 124, the second projected alignment point 125, and the third projected alignment point 126. The projected alignment image 128 can include a second projected quadrilateral 522 that has corners at the first projected alignment point 124, the third projected alignment point 126, the fourth projected alignment point 524, and the fifth projected alignment point 526.

A projected distance 504 is the distance between the first projected registration point 122 and the second projected registration point 123. The ratio between the registration distance 502 and the projected distance 504 can indicate the amount of scaling between the adaptive alignment image 118 and the projected alignment image 128 in the direction from the first projected registration point 122 and the second projected registration point 123.

The first projected quadrilateral 520 can correspond to the first quadrilateral 510. Each point in the first quadrilateral 510 corresponds to the corresponding point in the first projected quadrilateral 520. The mapping between the two quadrilaterals can be defined by the adjustment transform 401 of FIG. 4.

Calculating the adjustment for the adaptive alignment image 118 to correct the distortion in the projected alignment image 128 can be done in a variety of ways. For example, calculating the adjustment can be based on the entirety of the adaptive alignment image 118.

In another example, the adjustment can be calculated piecewise by calculating the adjustment for each quadrilateral included in the adaptive alignment image 118. The adjustment transform 401 for mapping the first quadrilateral 510 to the first projected quadrilateral 520 can be the skew transform 402 of FIG. 4. The graphical display system 100 of FIG. 1 can calculate the adjustment transform 401 for mapping the second quadrilateral 512 to the second projected quadrilateral 522.

Figure 6:
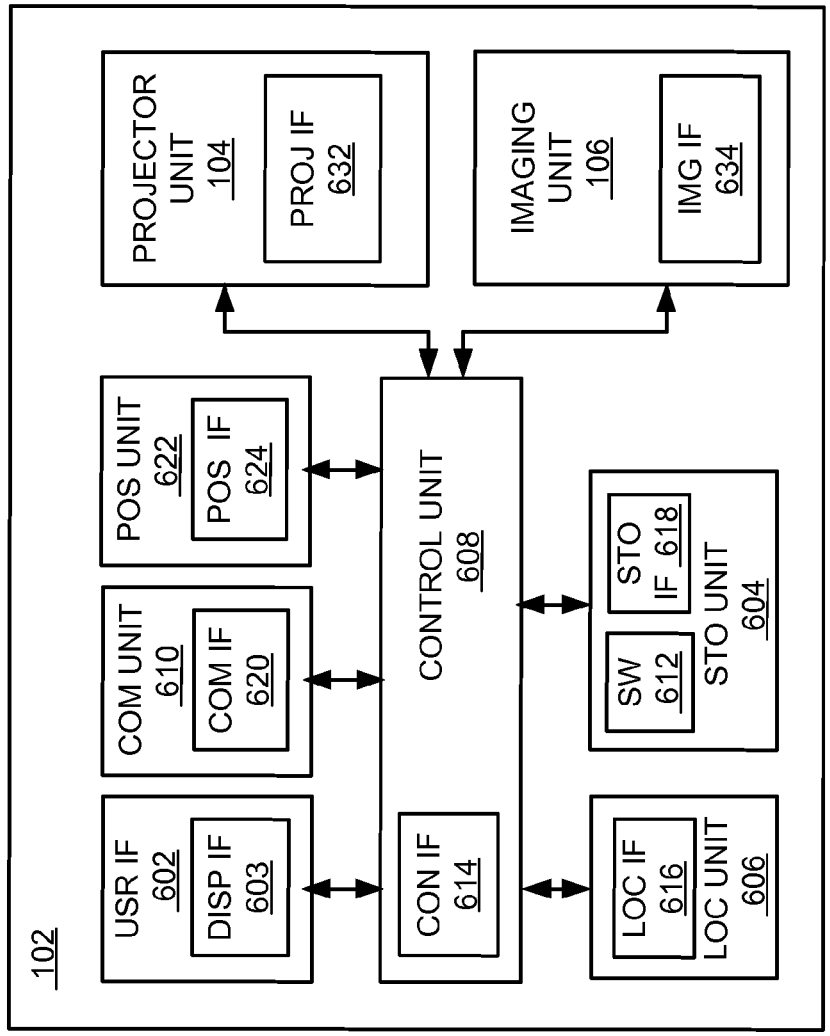
FIG. 6 is an exemplary block diagram of the projector device.

Referring now to FIG. 6, therein is shown an exemplary block diagram of the projector device 102. The projector device 102 can include a user interface 602, a storage unit 604, a location unit 606, a control unit 608, a communication unit 610, a position unit 622, the projector unit 104, and the imaging unit 106.

The user interface 602 allows a user (not shown) to interface and interact with the projector device 102. The user interface 602 can include an input device and an output device. Examples of the input device of the user interface 602 can include a keypad, a touchpad, soft-keys, a keyboard, a microphone, or any combination thereof to provide data and communication inputs. Examples of the output device of the user interface 602 can include a display interface 603. The display interface 603 can include a display, a projector, a video screen, a speaker, or any combination thereof.

The control unit 608 can execute a software 612 to provide the intelligence of the graphical display system 100. The control unit 608 can operate the user interface 602 to display information generated by the graphical display system 100. The control unit 608 can also execute the software 612 for the other functions of the graphical display system 100, including receiving location information from the location unit 606. The control unit 608 can further execute the software 612 for interaction with external devices via the communication unit 610.

The control unit 608 can be implemented in a number of different manners. For example, the control unit 608 can be a processor, an embedded processor, a microprocessor, a hardware control logic, a hardware finite state machine (FSM), a digital signal processor (DSP), or a combination thereof.

The control unit 608 can include a controller interface 614. The controller interface 614 can be used for communication between the control unit 608 and other functional units in the projector device 102. The controller interface 614 can also be used for communication that is external to the projector device 102.

The controller interface 614 can receive information from the other functional units or from external sources, or can transmit information to the other functional units or to external destinations. The external sources and the external destinations refer to sources and destinations external to the projector device 102.

The controller interface 614 can be implemented in different ways and can include different implementations depending on which functional units or external units are being interfaced with the controller interface 614. For example, the controller interface 614 can be implemented with a pressure sensor, an inertial sensor, a micro-electromechanical system (MEMS), optical circuitry, waveguides, wireless circuitry, wire line circuitry, or a combination thereof.

The location unit 606 can generate location information, current heading, and current speed of the projector device 102, as examples. The location unit 606 can be implemented in many ways. For example, the location unit 606 can function as at least a part of a global positioning system (GPS), an inertial navigation system, a cell-tower location system, a pressure location system, or any combination thereof.

The location unit 606 can include a location interface 616. The location interface 616 can be used for communication between the location unit 606 and other functional units in the projector device 102. The location interface 616 can also be used for communication that is external to the projector device 102.

The location interface 616 can receive information from the other functional units or from external sources, or can transmit information to the other functional units or to external destinations. The external sources and the external destinations refer to sources and destinations external to the projector device 102.

The location interface 616 can include different implementations depending on which functional units or external units are being interfaced with the location unit 606. The location interface 616 can be implemented with technologies and techniques similar to the implementation of the controller interface 614.

The storage unit 604 can store the software 612. The storage unit 604 can also store the relevant information, such as graphical content, text information, video data, advertisements, points of interest (POI), navigation routing entries, or any combination thereof.

The storage unit 604 can be a volatile memory, a nonvolatile memory, an internal memory, an external memory, or a combination thereof. For example, the storage unit 604 can be a nonvolatile storage such as non-volatile random access memory (NVRAM), Flash memory, disk storage, or a volatile storage such as static random access memory (SRAM).

The storage unit 604 can include a storage interface 618. The storage interface 618 can be used for communication between the location unit 606 and other functional units in the projector device 102. The storage interface 618 can also be used for communication that is external to the projector device 102.

The storage interface 618 can receive information from the other functional units or from external sources, or can transmit information to the other functional units or to external destinations. The external sources and the external destinations refer to sources and destinations external to the projector device 102.

The storage interface 618 can include different implementations depending on which functional units or external units are being interfaced with the storage unit 604. The storage interface 618 can be implemented with technologies and techniques similar to the implementation of the controller interface 614.

The communication unit 610 can enable external communication to and from the projector device 102. For example, the communication unit 610 can permit the projector device 102 to communicate with an external device, such as a peripheral device, a network server, a computer desktop, the external device on the Internet, or any combination thereof.

The communication unit 610 can also function as a communication hub allowing the projector device 102 to communicate with the external device. The communication unit 610 can include active and passive components, such as microelectronics or an antenna.

The communication unit 610 can include a communication interface 620. The communication interface 620 can be used for communication between the communication unit 610 and other functional units in the projector device 102. The communication interface 620 can receive information from the other functional units or can transmit information to the other functional units.

The communication interface 620 can include different implementations depending on which functional units are being interfaced with the communication unit 610. The communication interface 620 can be implemented with technologies and techniques similar to the implementation of the controller interface 614.

The position unit 622 can generate positioning, orientation, and motion information for the projector device 102. The position unit 622 can include an accelerometer, a laser gyroscope, a tilt sensor, mechanical sensors, electronic sensors, optical sensors, sonic sensors, ultrasonic sensors, or any combination thereof. The position unit 622 can be implemented in many ways. For example, the position unit 622 can function as at least a part of a global positioning system (GPS), an inertial navigation system, a cell-tower location system, a pressure location system, or any combination thereof.

The position unit 622 can include a position interface 624. The position interface 624 can be used for communication between the position unit 622 and other functional units in the projector device 102. The position interface 624 can also be used for communication that is external to the projector device 102.

The position interface 624 can receive information from the other functional units or from external sources, or can transmit information to the other functional units or to external destinations. The external sources and the external destinations refer to sources and destinations external to the projector device 102.

The position interface 624 can include different implementations depending on which functional units or external units are being interfaced with the position unit 622. The position interface 624 can be implemented with technologies and techniques similar to the implementation of the location interface 616.

The projector unit 104 can project the display image 110 on the display surface 130 including video information, text, graphical images, or any combination thereof. The projector unit 104 can be implemented in several ways. For example, the projector unit 104 can be implemented as a micro-projector, a micro-electromechanical system, a digital light processor system, or any combination thereof.

The projector unit 104 can include a projector interface 632. The projector interface 632 can be used for communication between the projector unit 104 and other functional units in the projector device 102. The projector interface 632 can also be used for communication that is external to the projector device 102.

The projector interface 632 can receive information from the other functional units or from external sources, or can transmit information to the other functional units or to external destinations. The external sources and the external destinations refer to sources and destinations external to the projector device 102.

The projector interface 632 can include different implementations depending on which functional units or external units are being interfaced with the projector unit 104. The projector interface 632 can be implemented with technologies and techniques similar to the implementation of the controller interface 614.

The imaging unit 106 can create an image of the projected image 120. The imaging unit 106 can be implemented in several ways. For example, the imaging unit 106 can be a digital camera, an infrared light sensor, an ultraviolet light sensor, a pinhole camera unit, or any combination thereof.

The imaging unit 106 can include an image interface 634. The image interface 634 can be used for communication between the imaging unit 106 and other functional units in the projector device 102. The image interface 634 can also be used for communication that is external to the projector device 102. The image interface 634 can receive information from the other functional units or from external sources, or can transmit information to the other functional units or to external destinations. The external sources and the external destinations refer to sources and destinations external to the projector device 102.

The image interface 634 can include different implementations depending on which functional units or external units are being interfaced with the imaging unit 106. The image interface 634 can be implemented with technologies and techniques similar to the implementation of the controller interface 614.

For illustrative purposes, the graphical display system 100 is shown with the partition having the user interface 602, the storage unit 604, the location unit 606, the control unit 608, the communication unit 610, the position unit 622, the projector unit 104, and the imaging unit 106 as one single device, although it is understood that the graphical display system 100 can have a different partition. For example, the projector unit 104 and the imaging unit 106 can be partitioned to work separately, individually, and independently as a separate device from the other functional units of the projector device 102. Also, the projector device 102 can include other functional units not shown in FIG. 6 for clarity.

The graphical display system 100 can include the user interface 602 and the control unit 608, coupled to the user interface 602. The graphical display system 100 can include the location unit 606 and the control unit 608 coupled to the position unit 622.

The graphical display system 100 can include the storage unit 604 coupled to the control unit 608. The navigation system can include the communication unit 610 coupled to the control unit 608.

Figure 7:
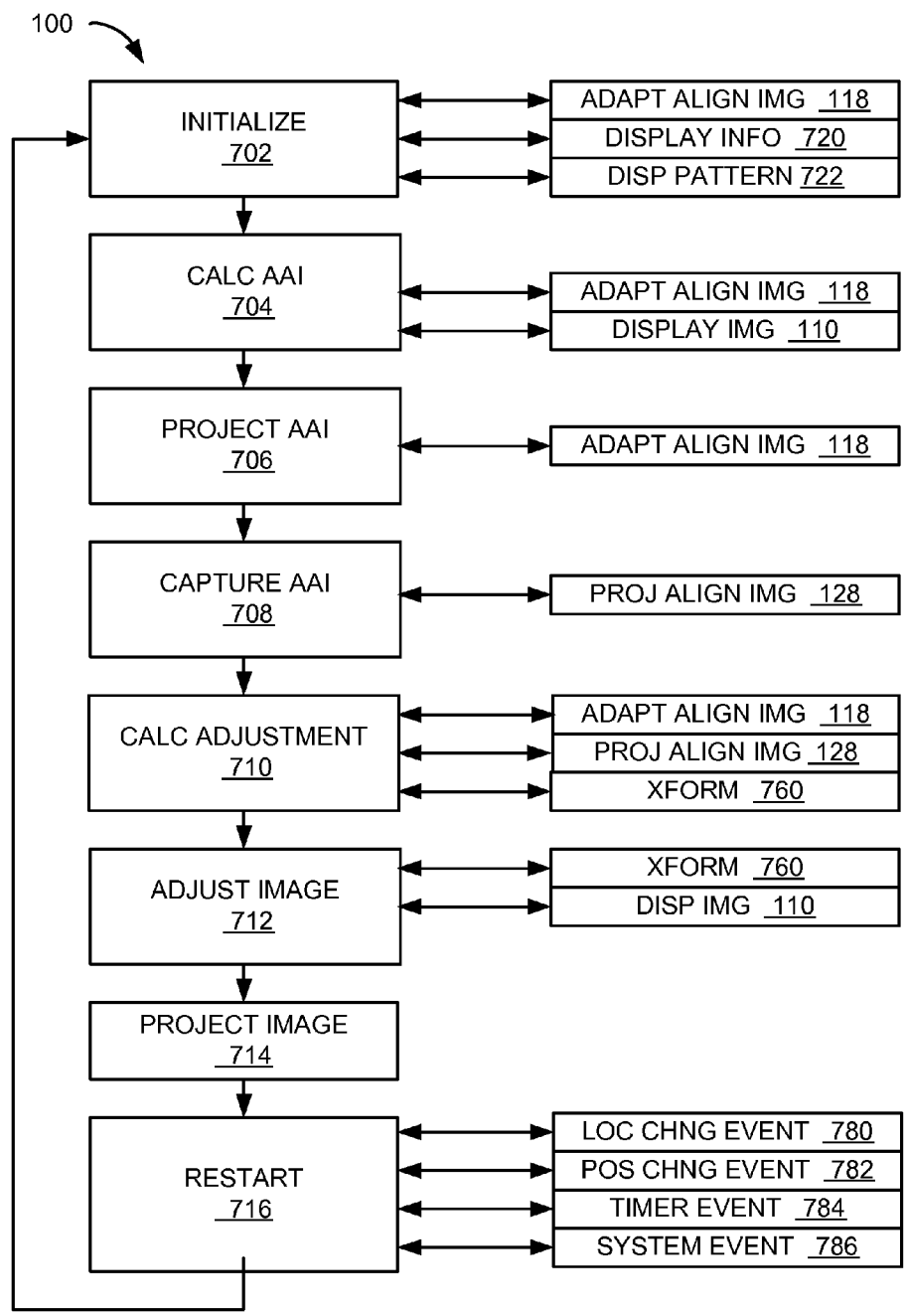
FIG. 7 is a control flow of the graphical display system.

Referring now to FIG. 7, therein is shown a control flow of the graphical display system 100. The graphical display system 100 can initialize the system, calculate the adaptive alignment image 118, and project the adaptive alignment image 118 on the display surface 130 of FIG. 1 using the projector device 102 of FIG. 1. The graphical display system 100 can capture the projected alignment image 128 of FIG. 1, calculate the adjustment for the projected alignment image 128, adjust the display image 110, and project the display image 110 of FIG. 1 on the display surface 130.

The graphical display system 100 can include an initialize module 702, a calculate adaptive alignment image module 704, and a project adaptive alignment image module 706. The graphical display system 100 can also include a capture adaptive alignment image module 708, a calculate adjustment module 710, an adjust image module 712, a project image module 714, and a restart module 716.

In the control flow of the graphical display system 100 as an example, each module is indicated by a number and successively higher module numbers follow one another. Control flow can pass from one module to the next higher numbered module unless explicitly otherwise indicated.

The physical transformation of moving the projector device 102 relative to the display surface 130 results in the adjustment of the projected image 120 of FIG. 1 to compensate for the distortion caused by the projection of the display image 110 on the display surface 130. As the position of the projector device 102 changes relative to the display surface 130, the movement of the projector device 102 creates additional information that can be used to adjust the display image 110. The adjustment of the projected image 120 increases the clarity and readability of the apparent image 140 of FIG. 1 from the viewers perceptive and reduces eyestrain as compared to an unadjusted image that is distorted by the display surface 130.

The flowchart of the graphical display system 100 describes the module functions or order as an example. The modules can be partitioned differently. Each of the modules can operate individually and independently of the other modules. Each module of the graphical display system 100 can be implemented using a combination of functional units of the projector device 102 of FIG. 6. For example, the graphical display system 100 can be implemented by running the software 612 of FIG. 6 on the control unit 608 of FIG. 6.

The projector device 102 can be operated in several different ways. For example, the projector device 102 can be operated as a single unit that can include both the hardware and software components of FIG. 6. In another example, the hardware and software components of the projector device 102 can be implemented in separate units.

The projector device 102 can receive graphical display information and perform initial calculations in the initialize module 702. The initialize module 702 can receive the graphical information to be displayed and initialize system parameters.

The initialize module 702 can receive the graphical information to be displayed in a variety of ways. For example, a display information 720 can be retrieved from the storage unit 604 of FIG. 6. In another example, the display information 720 can be received from an external source via the communication unit 610 of FIG. 6. The display information 720 can include a video file, image file, text, or any combination thereof.

The initialize module 702 can initialize the adaptive alignment image 118 by calculating a display pattern 722 and setting the adaptive alignment image 118 to the display pattern 722. The display pattern 722 is calculated by setting the display pattern 722 to an arrangement of fiduciary marks that can be modified to correspond to the display image 110. For example, the display pattern 722 can include a rectangular pattern of fiduciary marks, a dense pattern of fiduciary marks, a sparse pattern of fiduciary marks, a triangular pattern of fiduciary marks, or any combination thereof.

In yet another example, the display pattern 722 can include the first registration point 112 of FIG. 1 and the second registration point 113 of FIG. 1. The first registration point 112 and the second registration point 113 are separated by the registration distance 502 of FIG. 5. The display pattern 722 can also be calculated to position the first alignment point 114 of FIG. 1 at a fixed distance from the first registration point 112.

The display pattern 722 can be calculated in a variety of ways. For example, the display pattern 722 can be calculated by creating the fiduciary mark set 138 of FIG. 1 based on factors such as the shape of the display image 110, the size of the display image 110, the current location, an analysis of the display image 110, a system performance value, or any combination thereof. The display pattern 722 can also be calculated by selecting from a pre-defined set of patterns stored in the storage unit 604.

The adaptive alignment image 118 can include the fiduciary mark set 138 used to correlate the corresponding location in between images. The adaptive alignment image 118 can include the registration point set 134 of FIG. 1 and the alignment point set 136 of FIG. 1. The alignment point set 136 can be used to correlate points between multiple images and represent a finer grained resolution than the registration point set 134.

The projector device 102 can calculate the adaptive alignment image 118 in the calculate adaptive alignment image module 704. The calculate adaptive alignment image module 704 can modify the adaptive alignment image 118 using information about the color, brightness, and structure of the display image 110.

The calculate adaptive alignment image module 704 can set the size of the adaptive alignment image 118 to be the same size as the display image 110. The size of the adaptive alignment image 118 can indicate the number of points included in the adaptive alignment image 118. For example, the adaptive alignment image 118 can include a point for every pixel in the display image 110.

The calculate adaptive alignment image module 704 can set the size of the adaptive alignment image 118 to be smaller that the size of the display image 110. For example, the adaptive alignment image 118 can include a point for every 10 pixels in the display image 110. In another example, the adaptive alignment image 118 can include a total of eight points with four points in the registration point set 134 and four points in the alignment point set 136.

The calculate adaptive alignment image module 704 can modify the adaptive alignment image 118 to reduce the detectability of the adaptive alignment image 118. The detectability is defined as the ability of the user to perceive the adaptive alignment image 118 when projected onto the display surface 130.

For example, if the adaptive alignment image 118 included a grid of white alignment points of uniform brightness, then the adaptive alignment image 118 may be visible when inserted in the video stream 202 of FIG. 2, even though it is only displayed for a short period of time. This can be due to the persistence of vision effect where an afterimage may apparently remain visible even after an image is only briefly displayed. The adaptive alignment image 118 can appear to be flickering and degrade the visual performance of the graphical display system 100. Reducing the detectability of the adaptive alignment image 118 can include minimizing the flickering by reducing the visibility of the adaptive alignment image 118.

The calculate adaptive alignment image module 704 can calculate the adaptive alignment image 118 by comparing the location of the first alignment point 114 to the display image 110 and modifying the first alignment point 114 to have similar properties to the corresponding location in the display image 110. Similar properties can include the same color, the same brightness, or any combination thereof.

For example, the color of the first alignment point 114 and the first registration point 112 can be set to the color of the corresponding location in the display image 110. The brightness of the first alignment point 114 and the first registration point 112 can be set to the brightness of the corresponding location in the display image 110. Additional details about calculating the adaptive alignment image 118 can be found in a later section.

The projector device 102 can project the adaptive alignment image 118 in the project adaptive alignment image module 706. The project adaptive alignment image module 706 can insert the adaptive alignment image 118 into the video stream 202 for projecting onto the display surface 130.

The project adaptive alignment image module 706 can insert the adaptive alignment image 118 into the video stream 202 by creating the alignment frame 210 of FIG. 2 and inserting it to the video stream 202 at the alignment frame time 230 of FIG. 2. The alignment frame 210 can be inserted into the video stream 202 in a variety of methods. For example, the alignment frame 210 can replace an existing frame in the video stream 202. In another example, the alignment frame 210 can be added to the video stream 202 and the remaining frames can be moved forward by one frame. In yet another example, the alignment frame 210 can be inserted between two existing frames using the time interval between frames to display the alignment frame 210.

In a further example, the adaptive alignment image 118 can be projected using an invisible light source such as infrared light, ultraviolet light, or any combination thereof. The invisible light source emits light in frequency outside of the visible spectrum. In this case, the alignment frame 210 can be displayed simultaneously with the video stream 202.

The project adaptive alignment image module 706 can project the adaptive alignment image 118 on the display surface 130 in a variety of ways. For example, the project adaptive alignment image module 706 can project the adaptive alignment image 118 by sending the video stream 202 with the alignment frame 210 to the projector unit 104 of FIG. 1. In another example, the adaptive alignment image 118 can be projected on the display surface 130 by using an alternate projector including an infrared projector unit, an ultraviolet projector unit, or any combination thereof.

The projector device 102 can capture the adaptive alignment image 118 in the capture adaptive alignment image module 708. The capture adaptive alignment image module 708 can capture an image of the projected alignment image 128

The capture adaptive alignment image module 708 can capture the projected alignment image 128 using the imaging unit 106 of FIG. 1 to take an image of the projected alignment image 128. The image can be a variety of image types including a single photograph, a line by line scanned image, a partial image, or any combination thereof. The capture adaptive alignment image module 708 can capture the projected alignment image 128 by taking an image of the projected alignment image 128 on the display surface 130 when the alignment frame 210 is displayed at the alignment frame time 230 of FIG. 2.

The projected alignment image 128 shows the location of the first projected alignment point 124 of FIG. 1 and the first projected registration point 122 of FIG. 1 when the adaptive alignment image 118 is projected on the display surface 130. The first projected alignment point 124 and the first projected registration point 122 in the projected alignment image 128 correlate to the first alignment point 114 and the first registration point 112 in the adaptive alignment image 118, respectively. The distance between the first projected registration point 122 and the second projected registration point 123 of FIG. 1 is the projected distance 504 of FIG. 5.

The locations of the first projected alignment point 124, the first projected registration point 122, the first alignment point 114, and the first registration point 112 can be used to determine the distortion created by the projecting the adaptive alignment image 118 on the display surface 130. The location of the first projected registration point 122 can be calculated in a variety of manners. For example, the location of the first projected registration point 122 can be identified by finding the upper leftmost point in the projected alignment image 128.

The projected alignment image 128 can be captured by the imaging unit 106. The imaging unit 106 can be synchronized with the display of the projected alignment image 128 to capture an image of the display surface 130 when only the projected alignment image 128 is displayed. The synchronization with the alignment frame time 230 of FIG. 2 can insure that only the projected alignment image 128 is captured and not another portion of the video stream 202.

The imaging unit 106 can capture the projected alignment image 128 in a variety of methods. For example, the imaging unit 106 can take an image of the display surface 130 in the visible light spectrum and create the projected alignment image 128. In another example, the imaging unit 106 can be an infrared camera and can take an infrared picture of the display surface 130 to create the projected alignment image 128.

The first projected registration point 122, the second projected registration point 123, the first projected alignment point 124 and the second projected alignment point 125 of FIG. 1 can be identified in the projected alignment image 128 in a variety of methods. For example, the projected alignment image 128 can be normalized and contrast adjusted to eliminate the background by setting it to a uniform color and brightness that corresponds to the color black and a brightness of zero. The remaining locations with a brightness and color different from the black background in the projected alignment image 128 can be identified as fiduciary marks.

The first projected registration point 122 can be identified as the upper left-most fiduciary mark identified in the projected alignment image 128. The second projected registration point 123 can be identified as the upper right-most fiduciary mark identified in the projected alignment image 128.

The first projected alignment point 124 can be identified as the first fiduciary point detected along a line from the first projected registration point 122 to the second projected registration point 123. It is understood that the first fiduciary point detected may not lie directly on the line, but may be offset from the above mentioned line between the two registration points.

The second projected alignment point 125 can be identified as the first fiduciary point detected along a line extending from the first projected registration point 122 along a line perpendicular to the line from the first projected registration point 122 to the second projected registration point 123. It is understood that the fiduciary point detected may not lie directly on the line extending perpendicular to the first projected registration point, but may be offset from the above mentioned perpendicular line.

The projector device 102 can calculate an adjustment for the adaptive alignment image 118 in the calculate adjustment module 710. The calculate adjustment module 710 can calculate an adjustment for the adaptive alignment image 118 to compensate for the distortion caused by the projection of the display image 110 on the display surface 130. The calculate adjustment module 710 can receive the adaptive alignment image 118 and the projected alignment image 128 and can calculate an image transformation 760 that can be used to adjust the display image 110 to compensate for the distortion in the projected image 120 and create the apparent image 140.

The calculate adjustment module 710 can calculate the adjustment needed to compensate for the distortion caused by the surface variation 132 of FIG. 1 and the relative position of the projector device 102 to the display surface 130 by comparing the corresponding locations of the first alignment point 114 and the first projected alignment point 124. The distortion is defined as the difference in relative location between the first alignment point 114 and the first registration point 112 and the difference in relation to the location of the first projected alignment point 124 and the first projected registration point 122. The distortion can be caused by the surface variation 132 in the display surface 130.

In the flow chart of the calculate adjustment module 710, as an example, each module is indicated by a number and successively higher module numbers follow one another. Control flow can pass from one module to the next higher numbered module unless explicitly otherwise indicated.

The adjustment can be calculated in a variety of ways. For example, the adjustment can be calculated by examining the adaptive alignment image 118 as a single unit defined by the four corners of the projected image or on a piecewise basis for each quadrilateral formed by four adjacent fiduciary marks such as the first quadrilateral 510 of FIG. 5. In another example, the adjustment can be calculated by examining the adaptive alignment image 118 on a row by row basis for each horizontal row of pixels, on a vertical column basis for each vertical column of pixels, or any combination thereof.

The calculate adjustment module 710 can calculate the adjustment in a variety of methods. The adjustment can be a homogeneous transformation, a Euclidean transformation, an affine transformation, a projective transformation, a piecewise function transformation, or any combination thereof. The adjustment methods are described below.

A transformation is a set of mathematical operations that can map the set of points associated with one geometric shape to that of another geometric shape. A homogenous transformation is a linear transformation that uses homogenous coordinates, which represent a three-dimensional point using a 4-vector coordinate system. For example, a homogeneous coordinate for the point (x, y, z) is (x, y, z, 1).

A Euclidean transformation is a linear transformation that preserves the length and angle measurements of the object being transformed. A Euclidean transformation can include a translation, a rotation or a reflection.

An affine transformation is a linear transformation that preserves collinearity and ratios of distances between points. Collinearity is the property where all points lying on a line initially still lie on a line after transformation. Affine transformations do not preserve length and angle measurements of the points being transformed. An affine transformation can include scaling, shear, or any combination thereof.

A projective transformation is a linear transformation used in projective geometry that uses homogenous coordinates. A projective transformation describes what happens to the perceived position of an observed object when the point of view of the observer changes.

A piecewise function transformation is a transformation that uses a function with a definition that changes based on the location in the projected image 120. For example, the piecewise function may use a different definition when in an area of the projected image 120 that is projected on a curved surface. In another example, the piecewise function may use a different definition when the projected image is projected on a flat surface.

In an example, the adjustment can be the image transformation 760. The image transformation 760 can be a homogeneous transform H that can provide a mapping between the adaptive alignment image 118 and the projected alignment image 128. The homogenous transform H is a matrix that can be applied to point in the adaptive alignment image 118 to calculate the corresponding location in the projected alignment image 128.

The inverse of the image transformation 760, represented as the inverse transform $H^{-1}$, can map the projected alignment image 128 to the adaptive alignment image 118. The inverse transform $H^{-1}$ can be calculated by matrix mathematics operations where a matrix multiplication of $HH^{-1}$ equals the identity matrix. The inverse transform $H^{-1}$ of the transform H can be determined by calculating the determinant of H and multiplying it by the transpose of H. The transpose of a matrix can be created by writing the rows of the matrix as the columns of the transposed matrix.

In another example, the fiduciary mark set 138 in the adaptive alignment image 118 can each be represented by a matrix "$a_1$" in Equation 1 below. The fiduciary mark set 138 in the projected image 120 can each be represented by the matrix "$p_1$" in Equation 1 below. The homogenous transform H can be used to transform the adaptive alignment image 118 to the projected alignment image 128 as illustrated by the transformation operation examples in FIG. 4. The adjustment can be represented by an equation 1:

$$p_1 = a_1 H \quad (1)$$

Once the transform H has been calculated, the inverse transform $H^{-1}$ can be calculated and applied to the display image 110 to generate the modification to the display image 110 that will compensate for the distortion in the projected alignment image 128. The adjustment to can be represented by the using an equation 2:

$$a_1 = p_1 H^{-1} \quad (2)$$

In yet another example, if the projected alignment image 128 represents a transformation where the adaptive alignment image 118 is skewed by ½ a unit horizontally for every unit vertically, then the transformation H for a 2-dimensional skewing can be shown as by an equation 3:

$$\overbrace{\begin{bmatrix} 1 & K_x & 0 \\ K_y & 1 & 0 \\ 0 & 0 & 1 \end{bmatrix}}^{H} \overbrace{\begin{bmatrix} a_x \\ a_y \\ 1 \end{bmatrix}}^{a} = \overbrace{\begin{bmatrix} p_x = a_x * K_x \\ p_y = a_y * K_{=y} \\ w = 1 \end{bmatrix}}^{p} \quad (3)$$

Where $K_x = 0.5$, $K_y = 1$ and where point (4,4) corresponds to point (6,4), an equation 4 shows:

$$\begin{bmatrix} 1 & .5 & 0 \\ 0 & 1 & 0 \\ 0 & 0 & 1 \end{bmatrix} \begin{bmatrix} 4 \\ 4 \\ 1 \end{bmatrix} = \begin{bmatrix} 6 \\ 4 \\ 1 \end{bmatrix} \quad (4)$$

The projector device 102 can modify the display image 110 to correct the projected image 120 in the adaptive alignment image 118 in the adjust image module 712. The adjust image module 712 can apply the adjustment to the display image 110 that can result in the projected image 120 projected on the display surface 130 to create the apparent image 140.

The adjust image module 712 can modify the display image 110 using the image transformation 760 to compensate for the distortion of the projected image 120 caused by the surface variation 132 on the display surface 130. The adjust image module 712 can modify the display image 110 by applying the inverse of the image transformation 760 to recalculate the parameters of each pixel in the display image 110 so that the projected image 120 matches the display image 110.

For example, the adjustment can include the image transformation 760 that can map the adaptive alignment image 118 to the projected alignment image 128. The display image 110 can be adjusted using the inverse of the image transformation 760 to create the projected image 120 that compensates for the distortions caused by the surface variation 132 on the display surface 130.

The projector device 102 can project the display image 110 on the display surface 130 in the project image module 714. The project image module 714 can project the display image 110 for displaying on the display surface 130 with the projector unit 104.

The project image module 714 can project the display image 110 on the display surface 130 in a variety of ways. For example, the project image module 714 can project the display image 110 by sending the video stream 202 with the display image 110 to the projector unit 104. The projector unit 104 can project the display image 110 on the display surface 130 creating the projected image 120.

The projector device 102 can restart the adaptive keystone process in the restart module 716. The restart module 716 can cause the system to calculate the adaptive alignment image 118 and the adjustment to compensate for the distortion in the projected image 120 by transferring the control flow to the initialize module 702.

The restart module 716 can trigger the calculation of the adaptive alignment image 118 based on a detected motion, detected change of orientation, or when indicated by a system event such as by detecting a timer event. The trigger for restarting can be determined in various ways.

For example, the restart module 716 can trigger the calculation of the adaptive alignment image 118 when the location unit 606 of FIG. 6 indicates that there has been a change of location as indicated by a location change event 780. The location change event 780 is for indicating that the projector unit 104 has moved. The location change event 780 can trigger the calculation of the adaptive alignment image 118 to adapt to a change in relative location between the projector device 102 and the display surface 130. The change of location could include circumstances such as a change of room, a continuous motion of the projector device 102, an accidental jarring of the projector device 102, or any combination thereof.

In another example, the restart module 716 can trigger the calculation when the position unit 622 of FIG. 6 indicates that there has been a change of position indicated by a position change event 782. The position change event 782 can detect that the projector unit 104 has changed position relative to the display surface 130. The change of position can include a rotation of the projector device 102, a change in the tilt angle of the projector device 102, a change in orientation of the projector device 102, or any combination thereof.

In yet another example, the restart module 716 can trigger the calculation when a system event 786 occurs. The system event can include events such as a timer event 784, a power failure, an illumination source failure, a key press of a button, or any combination thereof. For example, the timer event 784 can indicate the expiration of an internal timer to indicate that a pre-defined period of time has passed. In another example, triggering the calculation based on the timer event 784 can enable a regular recalculation of the adjustment to allow ongoing recalculation of the adjustment of the projected image 120.

It has been discovered that the present invention provides the graphical display system 100 with adaptive keystone mechanism with improved image quality of the apparent image 140 resulting in reduced eyestrain by adjusting the display image 110 to compensate for distortions cause by projecting the display image 110 on the display surface 130. The projector device 102 can detect the movement of the projector device 102 using the location change event 780 and calculate the adjustment to the display image 110 to create the apparent image 140 for the change of location. This allows for an improved adaptive keystone mechanism where the projector device 102 can more quickly detect the need for an adjustment for the display image 110 to generate the projected image 120 on the display surface 130.

The projector device 102 can be implemented using a combination of functional units of the projector device 102 of FIG. 6. For example, the projector device 102 can be implemented by running the software 612 of FIG. 6 on the control unit 608 of FIG. 6, projecting the display image 110 using the projector unit 104, and capturing the projected image 120 using the imaging unit 106 of FIG. 6. In another example, the projector device 102 can be implemented using the location unit 606 of FIG. 6 to detect a change in location.

The initialize module 702 can be implemented with the control unit 608 of FIG. 6, the storage unit 604, and the software 612 of FIG. 6. For example, the software 612 can execute on the control unit 608 to retrieve the adaptive alignment image 118 from the storage unit 604.

The calculate adaptive alignment image module 704 can be implemented with the control unit 608, the storage unit 604, and the software 612. For example, the software 612 can execute on the control unit 608 to compare the adaptive alignment image 118 to the display image 110 to determine the color and brightness of the first alignment point 114 of the adaptive alignment image 118.

The project adaptive alignment image module 706 can be implemented with the control unit 608, the storage unit 604, the software 612, and the projector unit 104. For example, the software 612 can execute on the control unit 608 to send the adaptive alignment image 118 to the projector unit 104 for displaying on the display surface 130.

The capture adaptive alignment image module 708 can be implemented with the projector unit 104 and the imaging unit 106. For example, the imaging unit 106 can capture an image of the projected alignment image 128 created by the projector unit 104.

The calculate adjustment module 710 can be implemented with the control unit 608, the storage unit 604, and the software 612. For example, the software 612 can be retrieved from the storage unit 604 and can execute on the control unit 608 to calculate the adjustment to compensate for the difference in location of the first alignment point 114 and the first projected alignment point 124.

The adjust image module 712 can be implemented with the control unit 608, the storage unit 604, and the software 612. For example, the software can execute on the control unit 608 to retrieve the display image 110 from the storage unit 604 and apply the adjustment to the display image 110.

The project image module 714 can be implemented with the control unit 608, the storage unit 604, the software 612, the communication unit 610, and the projector unit 104. For example, the software 612 can execute on the control unit 608 to retrieve the display image 110 from the storage unit 604 and project the display image 110 on the display surface 130 using the projector unit 104. In another example, the video stream 202 can be received from the communication unit 610 and projected using the projector unit 104.

The restart module 716 can be implemented with the location unit 606, the position unit 622 of FIG. 6, the user interface 602 of FIG. 6, the control unit 608, the storage unit 604 of FIG. 6, and the software 612. For example, the software 612 can execute on the control unit 608 to monitor the location unit 606 to detect the occurrence of the location change event 780. In another example, the software 612 can monitor the position unit 622 to detect the occurrence of the position change event 782. In yet another example, the software 612 can detect the occurrence of the timer event 784.

Figure 8:
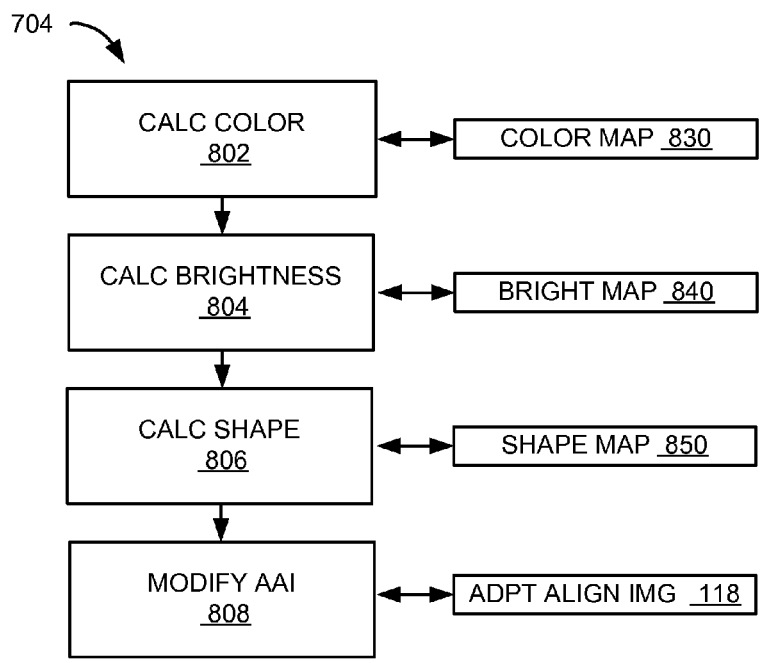
FIG. 8 is a detailed view of the calculate adaptive alignment image module.

Referring now to FIG. 8, therein is shown a detailed view of the calculate adaptive alignment image module 704. The calculate adaptive alignment image module 704 can create and modify the adaptive alignment image 118 to make the adaptive alignment image 118 blend in with adjacent video frames when displayed as part of the video stream 202 of FIG. 2. The calculate adaptive alignment image module 704 can calculate a color map 830, calculate a brightness map 840, calculate a shape map 850, and calculate the update to the adaptive alignment image 118.

In the flow chart of the calculate adaptive alignment image module 704, as an example, each module is indicated by a number and successively higher module numbers follow one another. Control flow can pass from one module to the next higher numbered module unless explicitly otherwise indicated.

The calculate adaptive alignment image module 704 can be implemented in several different ways. For example, the calculate adaptive alignment image module 704 can be implemented as software modules running on the control unit 608 of FIG. 6, as dedicated hardware modules, a combination of hardware and software modules, or any combination thereof. In another example, the calculate adaptive alignment image module 704 can be implemented as a single module on a single unit, as distributed modules running on separate units, or any combination thereof.

The calculate adaptive alignment image module 704 can calculate the color map 830 for altering the colors of the fiduciary mark set 138 of FIG. 1 of the adaptive alignment image 118 in a calculate color module 802. The calculate color module 802 can compare the adaptive alignment image 118 with the display image 110 of FIG. 1 and calculate the color map 830.

The calculate color module 802 can calculate the color map 830 by assigning the color of the first alignment point 114 of FIG. 1 to the color of the corresponding location in the display image 110. Calculating the color map 830 includes creating a mapping between the fiduciary mark set 138 in the adaptive alignment image 118 and the colors in the display image 110. The color map 830 can include a list of the locations of each of the fiduciary mark set 138 and the color of the corresponding location in the display image 110.

For example, the display image 110 is a rectangular array of pixels. A pixel is an individual visual element that has characterized including a location, a color, and an intensity. A location on the display image 110 can be represented by an x-coordinate and a y-coordinate written as two numbers enclosed in parentheses, (x, y) that represents the row and column of the location.

The adaptive alignment image 118 is a rectangular array of pixels. A location on the adaptive alignment image 118 can be represented by an x-coordinate and a y-coordinate written as two numbers enclosed in parentheses (x, y).

If the first registration point 112 of FIG. 1 in the adaptive alignment image 118 is at location (1,1) and the color at the corresponding location (1,1) in the display image 110 is yellow, then the color map 830 can indicate that the first registration point 112 should be mapped to the color yellow.

In another example, if the first alignment point 114 is at location (1,100) and the color at the corresponding location (1,100) in the display image 110 is blue, then the color map 830 can indicate that the color of the first alignment point 114 is blue.

The calculate adaptive alignment image module 704 can calculate the brightness map 840 for altering the brightness scheme of the adaptive alignment image 118 in a calculate brightness module 804. The calculate brightness module 804 can compare the adaptive alignment image 118 and the display image 110 and calculate the brightness map 840.

The calculate brightness module 804 can calculate the brightness map 840 by assigning the brightness of the first alignment point 114 to the brightness of the corresponding location in the display image 110. Calculating the brightness map 840 includes creating the mapping between the fiduciary mark set 138 in the adaptive alignment image 118 and the brightness of the corresponding locations in the display image 110. The brightness map 840 can include an entry for the brightness and location for the first alignment point 114, the first registration point 112, and the rest of the fiduciary mark set 138. The brightness map 840 can include the locations of each of the fiduciary mark set 138 and the associated brightness from the corresponding location in the display image 110.

For example, if the first registration point 112 in the adaptive alignment image 118 is at location (1,1) and the brightness at the corresponding location (1,1) in the display image 110 is 5, then the brightness map 840 can indicate that the first registration point 112 should be mapped to 5. In another example, if the first alignment point 114 is at location (1,100) and the brightness at the corresponding location (1,100) in the display image 110 is 9, then the brightness map 840 can indicate that the brightness of the first alignment point 114 is 9.

The calculate adaptive alignment image module 704 can calculate the shape map 850 for altering the shape scheme of the adaptive alignment image 118 in a calculate shape module 806. The calculate shape module 806 can use the adaptive alignment image 118 and the display image 110 to calculate the shape map 850.

The calculate shape module 806 can calculate the shape map 850 by identifying areas in the display image 110 that have the same consistency and identifying adjacent fiduciary marks with the same consistency between the adjacent fiduciary marks. Consistency is defined as where there is no variation in color or brightness of the pixels in the area. Consistency can also include the area where the variation in color or brightness of the pixels is within a pre-defined range of values. For example, the area can have the same consistency if the color of the pixels in that area have the same color value and the brightness of the pixels does not vary by more than 2%.

The shape map 850 can be calculated by identifying an area between the first alignment point 114 and the second alignment point 115 of FIG. 1 as having the same consistency and indicating that the first alignment point 114 can be removed. The areas in the display image 110 can be identified by comparing the pixels adjacent to each of the alignment point set 136 of FIG. 1 and determining if they have the same color and brightness as the first alignment point 114. The shape map 850 are the fiduciary marks that can be removed from the adaptive alignment image 118 to simplify the adjustment process and reduce the amount of processing required.

For example, the first alignment point 114 can be marked for removal if the area surrounding the first alignment point 114 and extending out to the adjacent fiduciary marks has no variation in color or brightness. Removing the first alignment point 114 from the shape map 850 can reduce the complexity of the adaptive alignment image 118 and shorten the amount of time needed to adjust the display image 110.

The calculate adaptive alignment image module 704 can modify the adaptive alignment image 118 in a modify adaptive alignment image module 808. The modify adaptive alignment image module 808 can apply the color map 830 and the brightness map 840 to the adaptive alignment image 118 to change the appearance and reduce the detectability of the adaptive alignment image 118. After the modify adaptive alignment image module 808 has successfully completed, the control flow can be transferred to the project adaptive alignment image module 706 of FIG. 7.

The modify adaptive alignment image module 808 can modify the adaptive alignment image 118 by using the color map 830 and the brightness map 840 to alter the color and brightness of the adaptive alignment image 118. Each point in the fiduciary mark set 138 of the adaptive alignment image 118 can be assigned the color and brightness of the corresponding points in the color map 830 and the brightness map 840 respectively.

For example, if the color map 830 indicates that the first alignment point 114 has a color blue, then the pixels that make up the first alignment point 114 in the adaptive alignment image 118 can be colored blue. In another example, if the brightness map 840 indicates that the first alignment point 114 has a brightness of 2, then the pixels that make up the first alignment point 114 in the adaptive alignment image 118 can be modified to represent a brightness of 2.

It has been discovered that the present invention provides the graphical display system 100 of FIG. 1 with improved image quality for adjusting the display image 110 by modifying the adaptive alignment image 118 using the color map 830, the brightness map 840, and the shape map 850. The adaptive alignment image 118 is modified so that the projected alignment image 128 of FIG. 1 is similar is color and brightness to the projected image 120 of FIG. 1 in the adjacent frame 221 of FIG. 2. This can result in reducing the detectability of the alignment frame 210 of FIG. 2 compared to an all white or all black version of the adaptive alignment image 118 and improved image quality when the alignment frame 210 is displayed next to the adjacent frame 221 in the video stream 202. Reducing the detectability of the alignment frame 210 makes the alignment frame 210 difficult to detect visually by users when presented in the video stream 202 because it matches the color and brightness of the adjacent frame 221. This allows for an improved adaptive keystone mechanism where the detectability of the alignment frame 210 is reduced and the overall image quality of the video stream 202 is improved.

Figure 9:
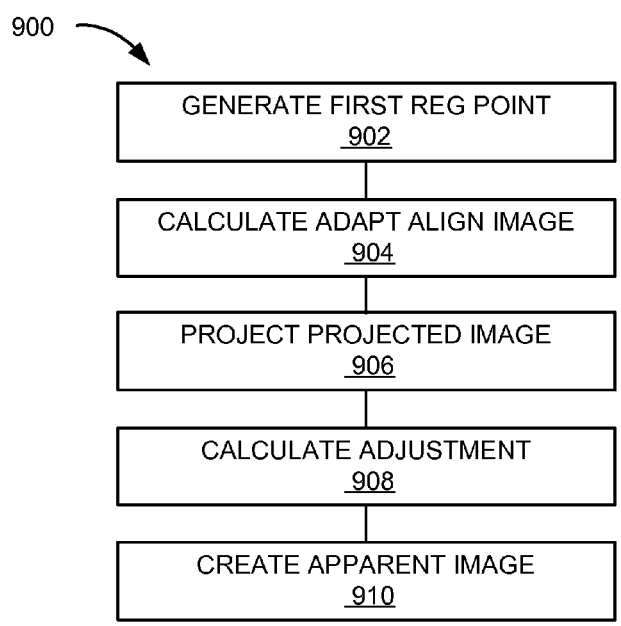
FIG. 9 is a flow chart of a method of operation of the graphical display system in a further embodiment of the present invention.

Referring now to FIG. 9, therein is shown a flow chart of a method 900 of operation of the graphical display system 100 in a further embodiment of the present invention. The method 900 includes: generating a first registration point of an adaptive alignment image in a block 902; calculating the adaptive alignment image having a first alignment point with a known location relative to the first registration point in a block 904; projecting a projected image, having a first projected registration point, with the adaptive alignment image for displaying on a display surface with the first alignment point is a first projected alignment point on the display surface in a block 906; calculating an adjustment for the adaptive alignment image using a relative location between the first alignment point and the first registration point, and the first projected alignment point and the first projected registration point, respectively in a block 908; and creating an apparent image as an adaptive keystone corrected perception of the projected image by modifying the display image with the adjustment for displaying from a projector device in a block 910.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another aspect of the present invention is that it valuably supports and services the historical trend of reducing costs, simplifying systems, increasing performance, reducing jitter, minimizing latency, and maximizing throughput. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a graphical display system comprising:
   generating a first registration point of an adaptive alignment image;
   calculating properties of the adaptive alignment image having a shape map with a first alignment point based on a consistency including no variation in color or brightness of pixels in a display image with a known location relative to the first registration point;
   projecting a projected image, having a first projected registration point, with the adaptive alignment image for displaying on a display surface with a first projected alignment point on the display surface;
   calculating an adjustment for the adaptive alignment image using a relative location between the first alignment point and the first registration point, and the first projected alignment point and the first projected registration point, respectively;
   and
   creating an apparent image as an adaptive keystone corrected perception of the projected image by modifying the display image with the adjustment for displaying from a projector device.

2. The method as claimed in claim 1 wherein calculating the properties of the adaptive alignment image includes:
   calculating a color map having the first alignment point based on the color of the display image; and
   modifying the adaptive alignment image using the color map for reducing the detectability of the adaptive alignment image.

3. The method as claimed in claim 1 wherein calculating the properties of the adaptive alignment image includes:
   calculating a brightness map having the first alignment point based on the brightness of the display image; and
   modifying the adaptive alignment image using the brightness map for reducing the detectability of the adaptive alignment image.

4. The method as claimed in claim 1 wherein calculating the properties of the adaptive alignment image includes:
   modifying the adaptive alignment image using the shape map for reducing a detectability of the adaptive alignment image.

5. The method as claimed in claim 1 wherein projecting the projected image on the display surface includes inserting the adaptive alignment image in an alignment frame between two successive frames in a video stream.

6. The method as claimed in claim 1 wherein projecting the projected image on the display surface includes inserting the adaptive alignment image in an alignment frame replacing an existing display frame in a video stream.

7. The method as claimed in claim 1 wherein calculating the properties of the adaptive alignment image includes setting the size of the adaptive alignment image to be the same size as the display image.

8. The method as claimed in claim 1 wherein calculating the properties of the adaptive alignment image includes setting the size of the adaptive alignment image to be smaller than the size of the display image.

9. The method as claimed in claim 1 wherein:
   projecting the projected image includes projecting the adaptive alignment image using infrared light; and
   further comprising:
   imaging the projection of the adaptive alignment image on the display surface with an imaging unit including an infrared light sensor.

10. The method as claimed in claim 1 wherein:
    projecting the projected image includes projecting the adaptive alignment image using ultraviolet light; and
    further comprising:
    imaging the projection of the adaptive alignment image on the display surface with the imaging unit including an ultraviolet light sensor.

11. A method of operation of a graphical display system comprising:
    generating a first registration point of an adaptive alignment image;
    calculating properties of the adaptive alignment image having a shape map with a first alignment point based on a consistency including no variation in color or brightness of pixels in a display image with a known location relative to the first registration point;
    projecting a projected image, having a first projected registration point, with the adaptive alignment image for displaying on a display surface with a first projected alignment point on the display surface;
    calculating an adjustment for the adaptive alignment image using a relative location between the first alignment point and the first registration point, and the first projected alignment point and the first projected registration point, respectively;
    calculating a display pattern for the adaptive alignment image for positioning the first registration point and the second registration point to determine a registration distance;
    and
    creating an apparent image as an adaptive keystone corrected perception of the projected image by modifying the display image with the adjustment for displaying from a projector device.

12. The method as claimed in claim 11 further comprising:
    triggering the calculation of the properties of the adaptive alignment image; and
    detecting a location change event to adapt to a change in relative location between a projector device and the display surface.

13. The method as claimed in claim 11 further comprising:
    triggering the calculation of the properties of the adaptive alignment image; and
    detecting a position change event to adapt to a change in position by a projector device relative to the display surface.

14. The method as claimed in claim 11 further comprising:
    calculating the adjustment for the adaptive alignment image includes calculating the adjustment using an affine transformation.

15. The method as claimed in claim 11 further comprising:
    calculating the adjustment for the adaptive alignment image includes calculating the adjustment using a projective geometry transformation.

16. The method as claimed in claim 11 further comprising:
calculating the adjustment for the adaptive alignment image includes calculating the adjustment using a homogenous transformation.

17. The method as claimed in claim 11 further comprising:
calculating the adjustment for the adaptive alignment image includes calculating the adjustment using a piecewise function transformation to calculate an approximation of a point location.

18. The method as claimed in claim 11 further comprising:
calculating the adjustment for the adaptive alignment image; and
calculating the adjustment for a first quadrilateral defined by four adjacent fiduciary marks.

19. The method as claimed in claim 11 further comprising:
calculating the adjustment for the adaptive alignment image; and
calculating the adjustment for a first quadrilateral defined by four corners of the projected image.

20. A graphical display system comprising:
a storage unit for generating a first registration point of an adaptive alignment image;
a control unit, coupled to the storage unit, for:
calculating properties of the adaptive alignment image having a shape map with a first alignment point based on a consistency including no variation in color or brightness of pixels in a display image with a known location relative to the first registration point;
calculating an adjustment for the adaptive alignment image using a relative location between the first alignment point and the first registration point, and a first projected alignment point and a first projected registration point, respectively;
detecting a timer event to allow regular adjustments of a projected image;
a projector unit, coupled to the control unit, for projecting the projected image, having the first projected registration point, with the adaptive alignment image for displaying on a display surface with the first projected alignment point on the display surface; and
a controller interface, coupled to the projector unit, for creating an apparent image as an adaptive keystone corrected perception of the projected image by modifying the display image with the adjustment for displaying from a projector device.

21. The system as claimed in claim 20 wherein:
the control unit, for calculating a color map having the first alignment point based on the color of the display image; and
a storage interface, coupled to the control unit, for modifying the adaptive alignment image using the color map for reducing the detectability of the adaptive alignment image.

22. The system as claimed in claim 20 wherein:
the control unit, for calculating a brightness map having the first alignment point based on the brightness of the display image; and
a storage interface, coupled to the control unit, for modifying the adaptive alignment image using the brightness map for reducing the detectability of the adaptive alignment image.

23. The system as claimed in claim 20 further comprising:
a storage interface, coupled to the control unit, for modifying the adaptive alignment image using the shape map for reducing the detectability of the adaptive alignment image.

24. The system as claimed in claim 20 further comprising:
a projector interface, coupled to the projector unit, inserting the adaptive alignment image in an alignment frame between two successive frames in a video stream.

25. The system as claimed in claim 20 further comprising:
a projector interface, coupled to the projector unit, for inserting the adaptive alignment image in an alignment frame by replacing an existing display frame in a video stream.

26. The system as claimed in claim 20 wherein
the control is for setting the size of the adaptive alignment image to be the same size as the display image.

27. The system as claimed in claim 20 wherein
the control unit is for setting the size of the adaptive alignment image to be smaller than the size of the display image.

28. The system as claimed in claim 20 further comprising:
a projector interface, coupled to the projector unit, for projecting the adaptive alignment image using infrared light; and
an imaging interface, coupled to the imaging unit, for imaging the projection of the adaptive alignment image on the display surface with an imaging unit includes an infrared light sensor.

29. The system as claimed in claim 20 further comprising:
a projector interface, coupled to the projector unit, for projecting the adaptive alignment image using ultraviolet light; and
an imaging interface, coupled to the imaging unit, for imaging the projection of the adaptive alignment image on the display surface with an imaging unit includes an ultraviolet light sensor.

30. The system as claim in claim 20 further comprising:
a storage interface, coupled to the control unit, for positioning the first registration point and the second registration point to determine a registration distance.

31. The system as claimed in claim 30 further comprising:
a location unit, coupled to the control unit, for triggering the calculation of the properties of the adaptive alignment image includes detecting a location change event in a location unit to adapt to a change in relative location between the projector device and the display surface.

32. The system as claimed in claim 30 further comprising:
a position unit, coupled to the control unit, for triggering the calculation of the properties of the adaptive alignment image includes detecting a position change event to adapt to a change in position by the projector device relative to the display surface.

33. The system as claimed in claim 30 wherein
the control unit is for calculating the adjustment using an affine transformation.

34. The system as claimed in claim 30 wherein
the control unit is for calculating the adjustment using a projective geometry transformation.

35. The system as claimed in claim 30 wherein
the control unit is for calculating the adjustment using a homogenous transformation.

36. The system as claimed in claim 30 wherein
the control unit is for calculating the adjustment using a piecewise function transformation to calculate an approximation of a point location.

37. The system as claimed in claim 30 wherein
the control unit is for calculating the adjustment for a first quadrilateral defined by four adjacent fiduciary marks.

38. The system as claimed in claim 30 wherein the control unit is for calculating the adjustment for a first quadrilateral defined by four corners of the projected image.

* * * * *